(12) United States Patent
Kaiser et al.

(10) Patent No.: US 11,898,501 B2
(45) Date of Patent: Feb. 13, 2024

(54) METHOD FOR CONTROLLING A GAS TURBINE BY MEANS OF A FUTURE COMBUSTION DYNAMIC

(71) Applicant: Siemens Energy Global GmbH & Co. KG, Bayern (DE)

(72) Inventors: Markus Kaiser, Munich (DE); Kai Heesche, Munich (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 78 days.

(21) Appl. No.: 17/442,820

(22) PCT Filed: Mar. 18, 2020

(86) PCT No.: PCT/EP2020/057424
§ 371 (c)(1),
(2) Date: Sep. 24, 2021

(87) PCT Pub. No.: WO2020/200783
PCT Pub. Date: Oct. 8, 2020

(65) Prior Publication Data
US 2022/0220904 A1     Jul. 14, 2022

(30) Foreign Application Priority Data

Mar. 29, 2019   (DE) .................... 10 2019 204 422.0

(51) Int. Cl.
*F02C 9/26* (2006.01)
*F02C 9/28* (2006.01)
(52) U.S. Cl.
CPC ................................. *F02C 9/26* (2013.01); *F02C 9/28* (2013.01)

(58) Field of Classification Search
CPC ................ F02C 9/00; F02C 9/26; F02C 9/28
See application file for complete search history.

(56) References Cited

U.S. PATENT DOCUMENTS

| 11,572,829 B2 * | 2/2023 | Yerram | ............... F02C 9/18 |
| 2003/0217554 A1 * | 11/2003 | Gadde | ............... F02C 9/28 60/776 |
| 2004/0011051 A1 * | 1/2004 | Ryan | ............... F02C 9/28 60/773 |

(Continued)

FOREIGN PATENT DOCUMENTS

| CN | 102713438 A | 10/2012 |
| DE | 4241729 A1 | 6/1994 |

OTHER PUBLICATIONS

PCT International Search Report and Written Opinion of International Searching Authority dated Aug. 6, 2020 corresponding to PCT International Application No. PCT/EP2020/057424 filed Mar. 18, 2020.

*Primary Examiner* — William H Rodriguez
(74) *Attorney, Agent, or Firm* — Wolter Van Dyke Davis, PLLC

(57) ABSTRACT

A method for controlling a gas turbine, having a measurement step, a prediction step which is carried out after the measurement step, and a control step which is carried out after the prediction step. In the measurement step, a state variable of a combustion within a gas turbine is measured. In the prediction step, a future combustion dynamic is predicted using the measured state variable. In the control step, a control signal is output using the prediction of the future combustion dynamic.

20 Claims, 2 Drawing Sheets

(56) References Cited

U.S. PATENT DOCUMENTS

| | | | |
|---|---|---|---|
| 2005/0247064 A1 | 11/2005 | Lieuwen | |
| 2006/0090471 A1* | 5/2006 | Shah | F02C 9/28 |
| | | | 60/803 |
| 2010/0162678 A1* | 7/2010 | Annigeri | F02C 3/22 |
| | | | 60/39.463 |
| 2010/0205976 A1* | 8/2010 | Nag | F02C 9/40 |
| | | | 60/775 |
| 2010/0280732 A1* | 11/2010 | Singh | F23N 5/082 |
| | | | 701/100 |
| 2011/0167782 A1* | 7/2011 | Tetzlaff | F02C 9/263 |
| | | | 137/12 |
| 2013/0036744 A1 | 2/2013 | Emberger | |
| 2014/0123624 A1 | 5/2014 | Minto | |
| 2014/0182298 A1* | 7/2014 | Krull | F02C 9/28 |
| | | | 60/773 |
| 2015/0152791 A1 | 6/2015 | White | |
| 2016/0010493 A1 | 1/2016 | ODea et al. | |
| 2017/0363015 A1 | 12/2017 | Minto et al. | |
| 2018/0003111 A1* | 1/2018 | Angel | F01D 19/00 |
| 2018/0223742 A1* | 8/2018 | Demougeot | F02C 7/057 |
| 2018/0356151 A1* | 12/2018 | Suraganda Narayana | |
| | | | G05B 23/0283 |
| 2020/0200035 A1* | 6/2020 | Nair | G01M 15/14 |
| 2022/0364508 A1* | 11/2022 | Ciciriello | F16F 15/18 |

\* cited by examiner

METHOD FOR CONTROLLING A GAS TURBINE BY MEANS OF A FUTURE COMBUSTION DYNAMIC

CROSS REFERENCE TO RELATED APPLICATIONS

This application is the US National Stage of International Application No. PCT/EP2020/057424 filed 18 Mar. 2020, and claims the benefit thereof. The International Application claims the benefit of German Application No. DE 10 2019 204 422.0 filed 29 Mar. 2019. All of the applications are incorporated by reference herein in their entirety.

FIELD OF INVENTION

The invention relates to a method for controlling a gas turbine by means of a future combustion dynamic of the gas turbine. The invention furthermore relates to a computer program for carrying out the method, to a control unit for carrying out the method, and to a gas turbine having such a control unit.

BACKGROUND OF INVENTION

Gas turbines, used for example in the generation of electricity or else in other specific applications, represent complex technical systems in which it is a challenge to control the internal procedures within the gas turbine, despite the underlying physical effects being understood. The combustion dynamics within a gas turbine in some instances lead to high accelerations of gas molecules within the turbine, said high accelerations potentially leading to damage to or the destruction of the gas turbine once a predefined limit value is exceeded. It is consequently necessary for the combustion dynamic within the gas turbine to be controlled so that such accelerations ideally do not arise, or arise only to an extent which is sustainable by the materials or the material, respectively, of the gas turbine. Corresponding safety systems which respond rapidly to high accelerations within the gas turbine and can reduce or interrupt, respectively, the supply of fuel to the gas turbine to exist. These safety systems are based on measuring the current combustion dynamic within the gas turbine and permit a damage-free or destruction-free, respectively, operation of the gas turbine. As a result of the reduced or interrupted, respectively, supply of fuel each intervention of such a safety system does however have a massive effect on operating parameters of the gas turbine such as, for example, on the delivered output, the composition of the exhaust gases in terms of the critical emission values, or the stable operation of the gas turbine.

SUMMARY OF INVENTION

The invention is based on an object of providing an alternative or additional, respectively, safety concept for the operation of the gas turbine. A prediction of a future combustion dynamic within the gas turbine is in particular to be utilized here, said prediction being provided by a combustion dynamic determined by means of a measured value. As a result, controlling of the gas turbine can take place as a function of predefined operating parameters of the gas turbine, said controlling influencing these operating parameters to a lesser degree.

This object is achieved by a method for controlling a gas turbine comprising the steps described hereunder. First, a state variable of a combustion within the gas turbine is measured in a measuring step. In a subsequent predicting step, a future combustion dynamic is predicted by means of the measured state variable. A control signal for the gas turbine is now emitted by means of the prediction of the future combustion dynamic in a controlling step. The determination of the prediction of the future combustion dynamic additionally or alternatively to carrying out an intervention by virtue of the currently measured state variable also permits an intervention in the control of the gas turbine by means of the future combustion dynamic obtained from the measured value. As a result, it can be predicted whether acceleration values within the gas turbine, which could result in damage and/or destruction of the gas turbine, will arise in the near future. Should this be the case, a corresponding control signal by way of which the combustion dynamic within the gas turbine can be varied in such a manner that such accelerations do not arise or arise only to a minor extent can be emitted. As a result, besides a retrospective intervention in the event of excessive accelerations, a prescient intervention when excessive accelerations are to be anticipated can also take place in this control method. Such a prescient intervention here can be less pronounced such that overall improved controlling of the gas turbine is achieved.

In one embodiment, a current combustion dynamic is determined from the determined state variable in an optional determining step, and the prediction of the future combustion dynamic is carried out by means of the state variable measured in the predicting step by taking into account the determined combustion dynamic. As a result, a plurality of measured values of the state variable of the combustion within the gas turbine, measured at mutual temporal intervals, can in particular be taken into account when predicting the future combustion dynamic. This enables a more accurate prediction of the future combustion dynamic.

In one embodiment, the current combustion dynamic comprises a profile of the combustion dynamic in a first predefined period. It can be provided that all of the values of the state variable of the combustion measured within the first predefined period are taken into account for determining the current combustion dynamic in the first predefined period. As a result, a further improvement in the prediction of the future combustion dynamic can be achieved.

In one embodiment of the method, a plurality of future combustion dynamics are determined from a plurality of current combustion dynamics. Control signals to be emitted are established by means of the plurality of future combustion dynamics, and the emission of the control signals in the controlling step takes place in such a manner that the control signal to be emitted is selected by means of a currently determined combustion dynamic. This makes it possible to determine current combustion dynamics during the operation of a gas turbine, and to predict future combustion dynamics by means of the current combustion dynamics and to establish whether or which, respectively, control signals are to be emitted when specific current combustion dynamics that would lead to specific future combustion dynamics arise. This enables an operator of the gas turbine to evaluate whether the control signals to be emitted are meaningful in terms of the future combustion dynamics and whether a corresponding test run is to be carried out. This makes it possible to establish a program for controlling the gas turbine by means of measured values of the state variable, and to apply the control signals which have been determined herein and are to be emitted only in a second step, upon having been cleared by the operator of the gas turbine. The level of acceptance in terms of testing this novel method for a gas turbine in the ongoing operation can be increased as a result.

In one embodiment, the future combustion dynamic comprises a prediction pertaining to a profile of the combustion dynamic in a second predefined period. It can be provided that the emission of a control signal takes place when a number of accelerations, or an intensity of accelerations, within the second predefined period becomes excessive by virtue of the future combustion dynamic. This can mean inter alia that the emission of the control signal takes place when a plurality of accelerations above a limit value will arise in the second predefined period.

It can be provided that the first predefined period and the second predefined period include an identical time sequence.

In one embodiment, a basic state process, a noise process and a peak process are taken into account in the predicting step so as to predict the future combustion dynamic. Accelerations by virtue of the combustion dynamic in gas turbines can generally be allocated to the three mentioned processes. The basic state process here is a process which leads to a slow variation of the combustion dynamic over several seconds or even over several 10 seconds. The noise process includes a superimposition of the basic state process with statistical noise on a significantly smaller time scale. A peak process represents an additional, very high acceleration within the combustion dynamic that arises on a very short time scale. The amplitude of the acceleration peaks triggered by the peak process here is significantly higher than the amplitude of the noise of the noise process. The accelerations of the combustion within the combustion dynamic that could lead to damage and/or destruction of the gas turbine can be substantially traced back to the peak process. When one or a plurality of corresponding peaks arise, conventional controls would now reduce the supply of fuel to the gas turbine so as to keep the arising accelerations below a predefined limit value. As a result of the prediction of the peak process indicated by the method according to the invention, in particular pertaining to a number and amplitude of the peaks arising in the near future, proactive controlling of the gas turbine can take place in which the control dynamic is varied in such a manner that peaks arise only to an extent, or only at a number and amplitude, respectively, which permits an operation of the gas turbine without damage or destruction, respectively.

In one embodiment, the basic state process, the noise process and the peak process in the predicting step are predicted by means of a Bayesian model. Bayesian models can also be used in the case of a small database and are thus suitable for predicting the future combustion dynamic. A model for predicting the future combustion dynamic here can be verified in that the model is applied to a current combustion dynamic and a future predicted combustion dynamic is compared with a future measured combustion dynamic.

In one embodiment, the basic state process, the noise process and the peak process are considered to be additive. This enables inter alia a simpler implementation of a Bayesian model in the predicting step.

In one embodiment, the peak process is modeled as a discrete function. The peak process here can be modeled as a product of a discrete sub-function and of a continuous sub-function. The discrete sub-function here can be used for modeling random times of the peaks. The continuous sub-function here can be used for modeling a functional correlation between the state variable, or the current combustion dynamic, respectively, and the frequency at which the peaks arise and the amplitudes of the peaks.

In one embodiment, the basic state process is modeled as a continuous function. The noise process can be modeled by way of a continuous function as well as a discrete function.

In one embodiment, the basic state process is modeled as a first Gaussian process. The first Gaussian process here can represent an uncertain profile of a deterministic function. As a result, a regression of the measured values to date can be utilized for determining a prediction of the basic state process for the future. The first Gaussian process here represents a continuous function.

In one embodiment, the noise process is modeled in the form of white noise. White noise is distinguished in that no prediction for the future profile of the noise can be made by means of the profile of the noise to date, but takes into account that an amplitude of the noise process in the temporal profile remains the same.

In one embodiment, the peak process is modeled as a superimposition of a Poisson process and of a second Gaussian process. The Poisson process here represents a discrete sub-function, while the second Gaussian process represents a continuous sub-function. As a result of the superimposition, the peak process is obtained as a discrete function. The Poisson process here can be used for modeling random times of the peaks. This means in particular that, by means of the Poisson process, the random times at which the peaks can arise can be taken into account when predicting the future combustion dynamic. It can be provided that the second Gaussian process is used for modeling a functional correlation between the state variable, or the current combustion dynamic, respectively, and a frequency at which the peaks arise and the amplitudes of the peaks.

In one embodiment, a quantity of fuel introduced into the gas turbine and/or a ratio of the fuel introduced into the gas turbine at different locations and/or an exhaust temperature is varied by means of the control signal. Gas turbines generally have a compressor, a combustion chamber and a turbine, in particular a gas expansion turbine. The fuel required for the operation of the gas turbine is introduced into the combustion chamber. It can be provided here that the fuel is introduced into the combustion chamber at different locations. Controlling the gas turbine can take place, on the one hand, in that the quantity of the fuel overall introduced is varied. On the other hand, controlling of the gas turbine can take place in that the ratio of the fuel introduced at the different locations is varied among said locations.

In one embodiment, the control signal is emitted by means of a target parameter or a combination of target parameters. At least one target parameter here can be established by means of an emission value and/or by means of a combustion stability and/or by means of an efficiency of a combustion. Alternative target parameters are likewise conceivable. The delivered output of the gas turbine is generally reduced by reducing the supply of fuel to a gas turbine. This generally simultaneously leads to at least one target parameter in terms of an emission value, thus in particular in terms of the pollutant emissions of the gas turbine, or in terms of the combustion stability, or in terms of the efficiency of the combustion, being improved. It can however be provided that a reduction in the output in the ongoing operation of the gas turbine cannot be considered, for example because an operator of the gas turbine is contractually obliged to provide a specific output of the gas turbine, for example if the gas turbine is used for the generation of electricity. A reduction in the output of the gas turbine in this instance leads to significant loss of revenue or even to corresponding contractual penalties. The selection, or the establishment, respectively, of the target parameters can take place in such a manner that the delivered output is ideally maintained and one of the target parameters is established by means of the emission value, the combustion stability or the efficiency, so as to enable an ideally low-emission, stable or efficient operation at a predefined delivered output. It may be the case that not all of the three mentioned target parameters can be simultaneously met. In this instance it can be provided that a corresponding selection of the target parameters to be taken into account takes place. It can additionally be provided that a reduction of the delivered output of the gas turbine is likewise provided as the last measure resorted to after the optimization in terms of the target parameters in terms of the emissions, the combustion stability and/or the efficiency.

The invention likewise comprises a computer program which comprises commands which when executing the computer program by a computer prompt the latter to carry out the method according to the invention. The computer program here can in particular be provided on a machine-readable memory, for example on a USB stick, on a CD, on a DVD, on a hard disk and/or on a server on the internet.

The invention furthermore comprises a control unit having an input for measuring a state variable and an output for emitting a control signal. The control unit furthermore comprises a computer unit which is specified for carrying out the method according to the invention. The control unit can have a memory, in particular a machine-readable memory, on which the computer program according to the invention is stored.

The invention furthermore comprises a gas turbine having such a control unit. It can be provided that more than one state variable is measured, and the prediction of the future combustion dynamic is determined by means of this plurality of measured state variables. It can be provided in this case that the control unit includes more than one input for corresponding control signals. The plurality of measured state variables can in particular improve the determination of the current combustion dynamic.

BRIEF DESCRIPTION OF THE DRAWINGS

The characteristics, features and advantages of this invention that have been described above, and the manner in which said characteristics, features and advantages are achieved, will become more evident and more distinctly comprehensible as a result of the explanations pertaining to the highly simplified, schematic illustrations of exemplary embodiments hereunder. In each case in a schematic illustration.

DETAILED DESCRIPTION OF INVENTION

Figure 1:
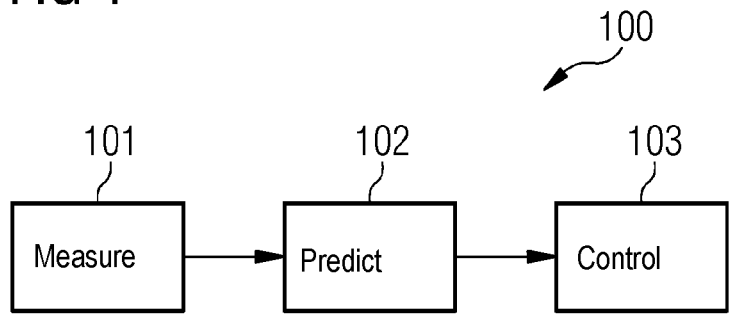
FIG. 1 shows a flow chart of a first exemplary embodiment of the method.

FIG. 1 shows a method 100 for controlling a gas turbine, comprising a measuring step 101, a predicting step 102 carried out after the measuring step 101, and a controlling step 103 carried out after the predicting step. A state variable of a combustion within a gas turbine is measured in the measuring step 101. The measuring step 101 can additionally comprise the measuring of further state variables of the combustion within the gas turbine. The state variable which is measured in the measuring step 101 can comprise, for example, a temperature within the gas turbine and/or an air pressure within or outside the gas turbine and/or an air humidity within or outside the gas turbine and/or a vibration of the gas turbine. A combustion dynamic within the gas turbine can depend on a combustion state within the gas turbine, wherein the combustion state can be determined by means of the measured state variable. A future combustion dynamic is predicted by means of the measured state variable in the predicting step 102. This future combustion dynamic can comprise statements pertaining to future anticipated accelerations within the gas turbine. A control signal by means of the prediction of the future combustion dynamic is emitted in the controlling step 103. The emission of this control signal can take place in such a manner that specific accelerations which could lead to damage and/or destruction of the gas turbine are avoided or prevented in the future combustion dynamic.

Figure 2:
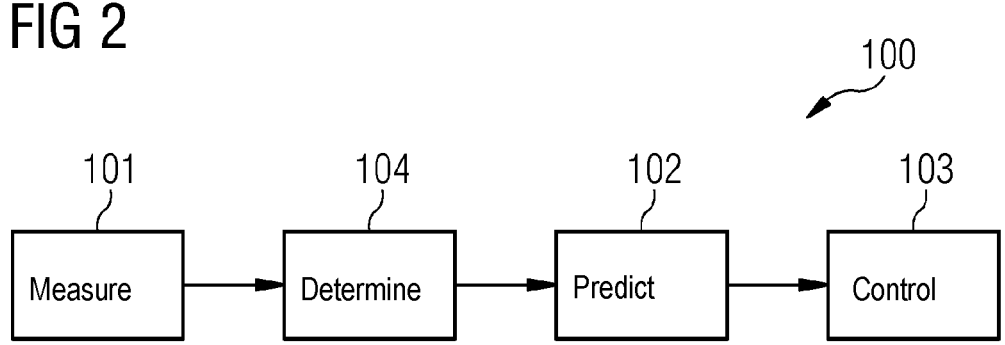
FIG. 2 shows a flow chart of a second exemplary embodiment of the method.

FIG. 2 shows a further exemplary embodiment of the method 100 of FIG. 1, having an additional determining step 104 between the measuring step 101 and the predicting step 102. A current combustion dynamic is determined from the determined state variable in the determining step 104, and the prediction of the future combustion dynamic in the predicting step 102 by means of the measured state variable is carried out while taking into account the determined combustion dynamic.

In one exemplary embodiment, the active combustion dynamic comprises a profile of the combustion dynamic in a first predefined period. The first predefined period here can be up to 60 seconds, in particular up to 30 seconds, and advantageously between 5 and 20 seconds. A positive prediction of the future combustion dynamic in the predicting step 102 can take place based on a current combustion dynamic determined over such a period.

Figure 3:
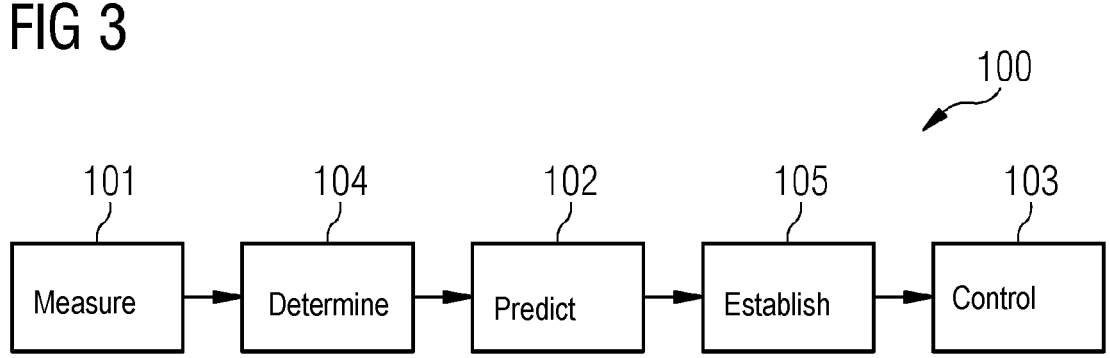
FIG. 3 shows a flow chart of a third exemplary embodiment of the method.

FIG. 3 shows a flow chart of a further exemplary embodiment of the method 100. Additionally to the method steps explained in FIG. 2, an establishing step 105 is provided between the predicting step 102 and the controlling step 103. A plurality of current combustion dynamics in successive periods is determined in the determining step 104. A future combustion dynamic is predicted for each current combustion dynamic in the predicting step 102. Control signals are established by means of the plurality of future combustion dynamics in the establishing step 105. The emission of the control signals in the controlling step 103 takes place by means of a currently determined combustion dynamic. In this exemplary embodiment, a gas turbine can be operated and the combustion dynamic can be determined and predicted during the operation. Control signals by means of which the turbine is to be controlled in real-time operation can subsequently be established. The controlling per se in this instance takes place by means of the control signals which have previously been established in the establishing step 105, enabling an operator of the gas turbine to first evaluate the control signals to be selected and to release the latter for the ongoing operation.

In this exemplary embodiment it can additionally and optionally be provided that further combustion dynamics are predicted, said further combustion dynamics being based on a theoretical variation or a theoretical emission of control signals and the resultant variations of the combustion dynamic. Corresponding control signals can then be established and evaluated by the operator of the gas turbine also for these future combustion dynamics which have been only theoretically determined and are not backed up by a current combustion dynamic.

In one exemplary embodiment, the future combustion dynamic comprises a prediction pertaining to a profile of the combustion dynamic in a second predefined period. The duration of the second predefined period here can correspond to the duration of the period of the first predefined period and/or be, for example, up to 60 seconds, in particular up to 30 seconds, and particularly between 5 and 20 seconds.

Figure 4:
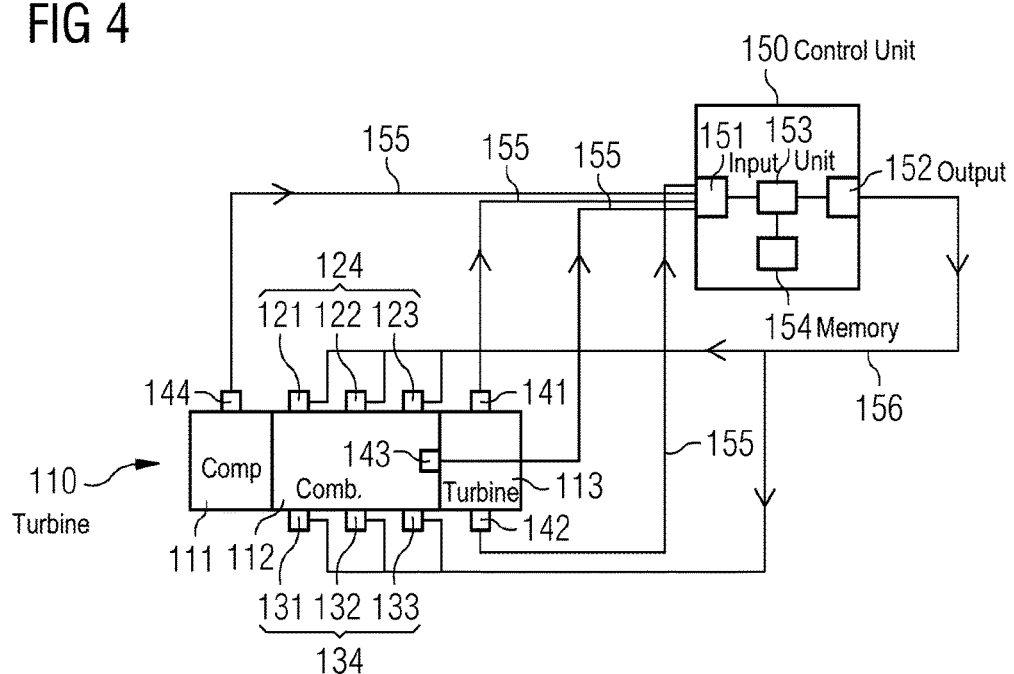
FIG. 4 shows a gas turbine having a control unit.

FIG. 4 shows a gas turbine 110 having a control unit 150. The gas turbine 110 here has a compressor 111, a combustion chamber 112, and the actual turbine 113. The turbine 113 can be designed as a gas expansion turbine. A first intake 121, a second intake 122, a third intake 123, a fourth intake 131, a fifth intake 132 and a sixth intake 133 are disposed on the combustion chamber 112. The intakes 121, 122, 123, 131, 132, 133 serve for introducing fuel into the combustion chamber 112. The fuel can then be combusted within the combustion chamber 112 and serves for driving the gas turbine 110. The delivered output of the gas turbine 110 can be controlled by way of the quantity of fuel introduced through the intakes 121, 122, 123, 131, 132, 133. The first intake 121, the second intake 122 and the third intake 123 here are combined so as to form a first unit 124. The fourth intake 131, the fifth intake 132 and the sixth intake 133 are combined so as to form a second unit 134. In alternative exemplary embodiments not shown here, only the first unit 124 may be provided. In further alternative exemplary embodiments not shown here, further units may be provided in a manner analogous to the first unit 124 or the second unit 134. For controlling the gas turbine 110, a predetermined quantity of fuel can be introduced into the combustion chamber 112 by way of the first unit 124 or the second unit 134, respectively. Additionally, the ratio of the introduced fuel among the first intake 121, the second intake 122 and the third intake 123 can be varied while maintaining the quantity of the fuel introduced by the first unit 124. The same applies to the ratio of the fuel of the second unit 134 introduced by means of the fourth intake 131, the fifth intake 132 and the sixth intake 133. The ratio of the intakes 121, 122, 123, 131, 132, 133 of the units 124, 134 among one another here can be identical. This means that the same proportion of the overall fuel quantity of the first unit 124 and of the second unit 134 is introduced by way of the first intake 121 and the fourth intake 131, the same applying in each case to the second intake 122 and the fifth intake 132, and the third intake 123 and the sixth intake 133, respectively. A first measuring sensor 141 is disposed on the turbine 113, as is a second measuring sensor 142. A third measuring sensor 143 is disposed within the combustion chamber 112. A fourth measuring sensor 144 is disposed on the compressor 111. The measuring sensors 141, 142, 143, 144 are specified for determining a state variable of a combustion within the gas turbine 110. The first measuring sensor 141 and the second measuring sensor 142 can be designed as a temperature sensor or as a vibration sensor, for example. The third measuring sensor 143 can in particular be designed as a temperature sensor for determining a temperature within the combustion chamber 112. The fourth measuring sensor 144 can in particular be designed as a vibration sensor on the compressor 111. The measuring sensors 141, 142, 143, 144 are connected to an input 151 of the control unit 150 by way of measuring lines 155. The control unit 150 furthermore has an output 152 which by means of a control line 156 is connected to the intakes 121, 122, 123, 131, 132, 133. A quantity of a fuel which is introduced into the combustion chamber 112 can be regulated by way of the output 152 and the control lines 156. Furthermore, a ratio of the fuel quantity introduced in each case through the intakes of a unit 124, 134 can additionally be varied. The control unit 150 furthermore has a computer unit 153 which is connected to the input 151 and to the output 152 and which is specified for carrying out the method according to the invention described in FIGS. 1 to 3. The control unit 150 additionally has an optional memory 154 in which a computer program for carrying out the method can be stored. The computer program here can contain program code which, when the program code is executed on the computer unit 153, prompts the computer unit 153 to carry out the method according to the invention.

In one exemplary embodiment of the method, a quantity of a fuel introduced into the gas turbine 110, in particular a quantity of fuel introduced by way of the intakes 121, 122, 123, 131, 132, 133, is controlled by means of a control signal emitted by way of the output 152 and the control lines 156. In one exemplary embodiment, a ratio of fuel introduced into the gas turbine 110 at different locations is controlled by way of the output 152 and the control lines 156, in particular by varying the quantity of the fuel introduced by way of the intakes 121, 122, 123 of the first unit 124 and by way of the intakes 131, 132, 133 of the second unit 134. In one exemplary embodiment, an exhaust gas temperature of the gas turbine 110 is varied by the control signal emitted by way of the output 152 and the control line 156.

In one exemplary embodiment, the control signal emitted by way of the output 152 and the control lines 156 is emitted by means of a target parameter or a combination of target parameters. At least one target parameter is selected by means of an emission value and/or by means of a combustion stability and/or by means of an efficiency of the combustion of the gas turbine 110.

Figure 5:
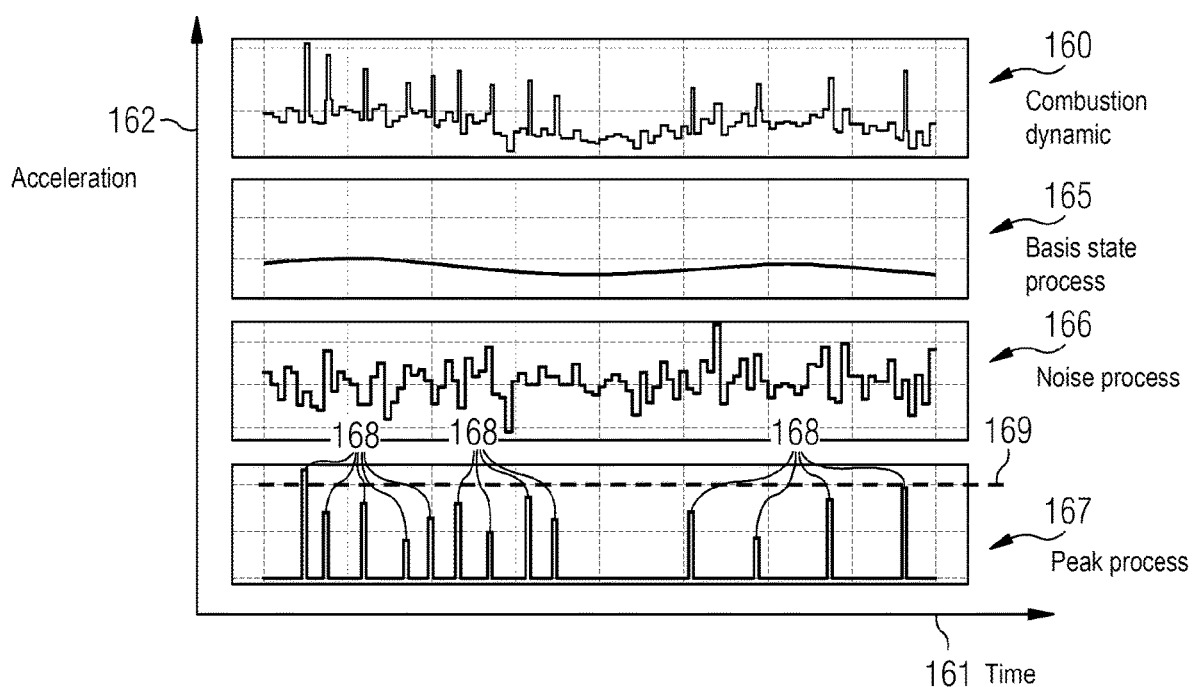
FIG. 5 shows a current combustion dynamic and the allocation of the current combustion dynamic between a basic state process, a noise process and a peak process.

FIG. 5 shows a combustion dynamic 160 which may correspond to a current combustion dynamic or else a future combustion dynamic while the method is being carried out. An x-axis 161 here represents the time lapse, while a y-axis 162 represents an acceleration which arises by virtue of a combustion dynamic 160 within the gas turbine 110. The combustion dynamic 160 substantially has a baseline with some variations and some noise which is superimposed by individual acceleration peaks. The combustion dynamic 160 can be divided into three components which are likewise illustrated in FIG. 5. The combustion dynamic 160 can be divided into a basic state process 165, a noise process 166, and a peak process 167. The basic state process 165 here represents a slow variation of the acceleration value over time by virtue of different gas turbine states. The latter are superimposed by the statistical noise process 166 which includes an entirely random distribution of a noise amplitude. The peak process 167 comprises individual peaks 168 which at specific times lead to a high acceleration within the gas turbine 110. By dividing the combustion dynamic 160 into the basic state process 165, the noise process 166 and the peak process 167, the combustion dynamic 160 can be divided into components which are to be treated differently in statistical terms. When this takes place for a current state process which has been determined by virtue of measured data, a future profile of the basic state process 165, of the noise process 166 and of the peak process 167 can in each case be determined by means of this division in the predicting step 102, and the future combustion state can be determined by superimposing the basic state process 165, the noise process 166 and the peak process 167.

It can be provided that the basic state process 165, the noise process 166 and the peak process 167 in the predicting step 102 are predicted by means of a Bayesian model. Bayesian models can also be used in the case of comparatively small databases and are thus suitable for predicting the future combustion dynamic 160. A model for predicting the future combustion dynamic 160 here can be verified in that the model is applied to a current combustion dynamic and a future predicted combustion dynamic is compared with a future measured combustion dynamic.

In one embodiment, the basic state process 165, the noise process 166 and the peak process 167 are considered to be additive. This enables inter alia a simpler implementation of a Bayesian model in the predicting step 102.

In one embodiment, the peak process 167 is modeled as a discrete function. The peak process 167 here can be modeled as a product of a discrete sub-function and of a continuous sub-function. The discrete sub-function here can be used for modeling random times of the peaks 168. The continuous sub-function here can be used for modeling a functional correlation between the state variable, or the current combustion dynamic, respectively, and a frequency at which the peaks 168 arise and the amplitudes of the peaks 168.

In one embodiment, the basic state process 165 is modeled as a continuous function. The noise process 166 can be modeled by a continuous function as well as a discrete function.

The basic state process 165 here can be modeled as a first Gaussian process. The first Gaussian process here represents a continuous function. The noise process 166 can be modeled in the form of white noise. The peak process 167 can be modeled as a superimposition of a Poisson process and a second Gaussian process. The Poisson process here can be used for modeling random times of the peaks 168. The Poisson process represents a discrete sub-function. The second Gaussian process can be used for determining a functional correlation between the determined combustion dynamic 160 and the frequency and/or the amplitude of the peaks 168 of the peak process 167. The second Gaussian process represents a continuous sub-function. As a result of the superimposition, the peak process here is modeled as a discrete function.

In the future combustion dynamic 160, the control signals to be emitted can be selected by means of the amplitude and the frequency of the peaks 168 so as to in particular not permit any peaks, or only a specific number of peaks 168 above a limit value 169 which in FIG. 5 is illustrated by a dashed line, over a predefined third period. In the illustration of FIG. 5 there is only one peak 168 that is higher than the limit value 169. It can be, for example, that a single occurrence of such an acceleration does not yet lead to damage and/or destruction of the gas turbine 110. A corresponding intervention by the control system is only required when a peak 168 above the limit value 169 arises multiple times.

It can be provided that the prediction of the future combustion dynamic 160 is carried out by the formulae and methods described hereunder. Data pairs (x, y) are considered, wherein each x-value is assigned one y-value. The x-value here can be the elapsed time; the y-value can be a variable, for example an acceleration, describing the combustion dynamic 160. The correlation of the x-values and the y-values takes place by means of the formula:

$$y = f(x) + g(x) + \epsilon$$

The function f(x) here represents a basic state function so that the basic state process 165 is described by the function f(x). The function g(x) here represents a peak function so that the peak process 167 is described by the function g(x). $\epsilon$ represents the noise so that the noise process 166 is described by $\epsilon$.

Considered in the Bayesian model is a parameter set $\theta$ by way of which a probability for a correlation between the x-values and the y-values can be considered. The consideration of probability can be represented by means of the following formula:

$$p(y|\theta, x) = \int \underbrace{p(y|f, g)}_{\text{Addition and Noise}} \underbrace{p(f|\theta, x)}_{\text{Basic State}} \underbrace{P(g|\theta, x)}_{\text{Peaks}} \underbrace{p(\theta)}_{\text{Expert Knowledge}} df\, dg\, d\theta$$

The additive consideration of the basic state process 165, the noise process 166 and the peak process 167 here is taken into account by the addition and noise term. The entire correlation between the x-values and the y-values can take place only when all terms are simultaneously considered. Because the integral stated in the formula can generally not be solved, the integral can initially be approximated by means of a calculus of variations and subsequently be calculated by means of sampling. When sampling, random samples conjointly with a predefined distribution of probability can be used for calculating the approximate integral. The expert knowledge here can be part of a prior of the Bayesian model.

This method described can be used in particular when the basic state process 165 is modeled as a continuous function and the peak process 167 is modeled as a continuous function.

While the invention has been illustrated and described in more detail by the exemplary embodiment, the invention is not limited by the disclosed examples, and other variations can be derived therefrom by the person skilled in the art without departing from the scope of protection of the invention.

The invention claimed is:

1. A method for controlling a gas turbine, comprising:
   measuring a state variable of a combustion within the gas turbine in a measuring step;
   predicting a future combustion dynamic by means of the measured state variable in a predicting step; and
   emitting a control signal by means of the prediction of the future combustion dynamic in a controlling step;
   wherein a basic state process, a noise process and a peak process are taken into account in the predicting step so as to predict the future combustion dynamic.

2. The method as claimed in claim 1,
   wherein a current combustion dynamic is determined from the measured state variable in a determining step, and the prediction of the future combustion dynamic by means of the measured state variable in the predicting step takes place while taking into account the current combustion dynamic.

3. The method as claimed in claim 2,
   wherein the current combustion dynamic comprises a profile of the combustion dynamic in a first predefined period.

4. The method as claimed in claim 2,
   wherein a plurality of current combustion dynamics are determined from a plurality of future combustion dynamics, wherein control signals to be emitted are established by means of the plurality of future combustion dynamics in an establishing step, and wherein the emission of the control signals in the controlling step takes place in such a manner that the control signal to be emitted is selected by means of a currently determined combustion dynamic.

5. The method as claimed in claim 1, wherein the future combustion dynamic comprises a prediction pertaining to a profile of the combustion dynamic in a second predefined period.

6. The method as claimed in claim 1, wherein the basic state process is a variation of an acceleration value within the gas turbine over time by virtue of different gas turbine states; wherein the noise process includes a random distribution of a noise amplitude over time; and wherein the peak process comprises individual peaks that indicate peak values of an acceleration within the gas turbine at one or more specific times.

7. The method as claimed in claim 1, wherein the basic state process, the noise process and the peak process in the predicting step are predicted by means of a Bayesian model.

8. The method as claimed in claim 1, wherein the basic state process, the noise process and the peak process are considered to be additive.

9. The method as claimed in claim 1, wherein the peak process is modeled as a discrete function.

10. The method as claimed in claim 1, wherein the basic state process is modeled as a continuous function.

11. The method as claimed in claim 1, wherein a quantity of a fuel introduced into the gas turbine and/or a ratio of the fuel introduced into the gas turbine at different locations and/or an exhaust gas temperature can be varied by means of the control signal.

12. The method as claimed in claim 1, wherein the control signal is emitted by means of a target parameter or a combination of target parameters, wherein at least one target parameter is established by means of an emission value and/or by means of a combustion stability and/or by means of an efficiency of a combustion.

13. A non-transitory computer readable medium, comprising:
a computer program stored thereon having commands which when executed by a computer carries out the method as claimed in claim 1.

14. A control unit, comprising:
an input for measuring a state variable,
an output for emitting a control signal, and
a computer unit, wherein the computer unit is adapted for carrying out the method of claim 1.

15. A gas turbine comprising:
a control unit as claimed in claim 14.

16. The method as claimed in claim 1, wherein the state variable is at least one of:
a temperature within the gas turbine;
an air pressure within or outside the gas turbine;
an air humidity within or outside the gas turbine; and
a vibration within the gas turbine.

17. The method as claimed in claim 1, further comprising preventing specific accelerations in the future combustion dynamic that damage or destroy the gas turbine, based on the control signal of the emitting step.

18. The method as claimed in claim 1,
wherein the measuring the state variable comprises measuring, with one or more sensors, a value of the state variable;
wherein the method further comprises transmitting, from the sensors to an input of a controller, data that indicates the measured state variable; and
wherein the emitting the control signal comprises emitting, from an output of the controller to one or more fuel intakes of the gas turbine, the control signal to vary an amount of fuel input at the respective one or more fuel intakes.

19. The method as claimed in claim 2, further comprising:
dividing the current combustion dynamic into the basic state process, the noise process and the peak process;
predicting a future profile of the basic state process, the noise process and the peak process; and
determining the future combustion dynamic based on the future profile of the basic state process, the noise process and the peak process.

20. The method as claimed in claim 6, wherein the controlling step comprises identifying one or more of the individual peaks of the peak process whose peak values of acceleration exceed a limit value of acceleration and wherein the emitted control signal prevents the identified one or more individual peak values of acceleration within the gas turbine.

* * * * *